(12) United States Patent
Steiner

(10) Patent No.: US 6,625,718 B1
(45) Date of Patent: Sep. 23, 2003

(54) POINTERS THAT ARE RELATIVE TO THEIR OWN PRESENT LOCATIONS

(75) Inventor: Robert C. Steiner, Broomfield, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 746 days.

(21) Appl. No.: 09/019,137

(22) Filed: Feb. 5, 1998

(51) Int. Cl.[7] .............................................. G06F 12/06
(52) U.S. Cl. ...................................... 711/220; 711/200
(58) Field of Search ................................ 711/200, 201, 711/202, 203, 209, 210, 211, 220; 707/103

(56) References Cited

U.S. PATENT DOCUMENTS

| | | | | |
|---|---|---|---|---|
| 4,445,173 A | * | 4/1984 | Pilat et al. ................... | 711/200 |
| 5,432,936 A | * | 7/1995 | Gray et al. ................... | 395/705 |
| 5,493,660 A | * | 2/1996 | DeLano et al. .............. | 711/206 |
| 5,504,901 A | * | 4/1996 | Peterson ...................... | 395/700 |
| 5,617,569 A | * | 4/1997 | Gray et al. ................... | 707/103 |
| 5,724,540 A | * | 3/1998 | Kametani ..................... | 711/220 |
| 5,754,862 A | * | 5/1998 | Jones et al. .................. | 395/705 |
| 5,873,078 A | * | 2/1999 | Angle et al. .................... | 707/3 |
| 5,892,939 A | * | 4/1999 | Call et al. .............. | 364/468.03 |
| 5,956,756 A | * | 9/1999 | Khalidi et al. ............... | 711/207 |

* cited by examiner

Primary Examiner—Tuan V. Thai
(74) Attorney, Agent, or Firm—David Volejnicek

(57) ABSTRACT

An auto (i.e., self)-relative pointer (114, 115) in a data structure (103) of a computer (100) defines a pointed-to location (106, 107) by means of an offset from its own location (104, 105). The address (124, 125) of the pointer is offset by the value (M, N) of the pointer obtain the address (126, 127) of the pointed-to location.

11 Claims, 2 Drawing Sheets

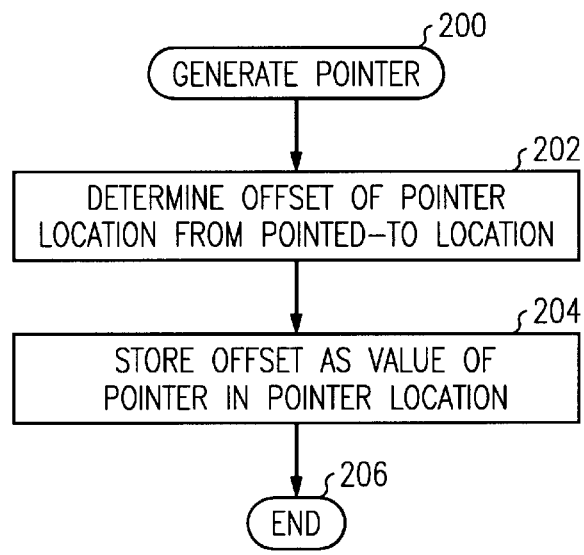
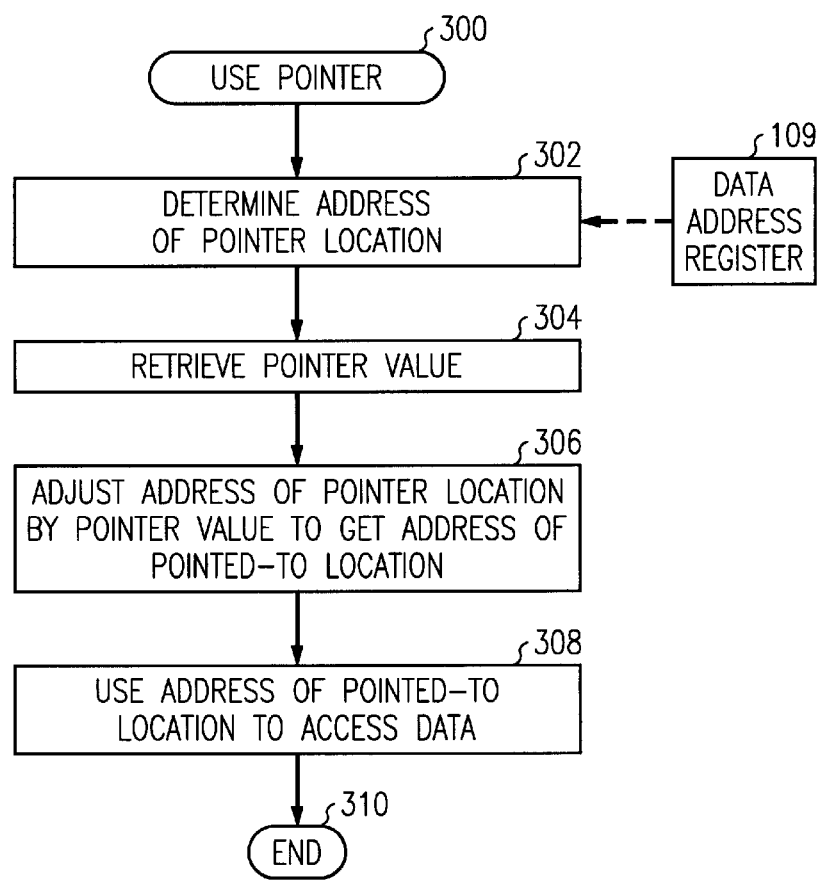

POINTERS THAT ARE RELATIVE TO THEIR OWN PRESENT LOCATIONS

TECHNICAL FIELD

This invention relates to address generation and modification in computer programs.

BACKGROUND OF THE INVENTION

In a software data structure, a pointer is an identifier (e.g., a variable) that indicates the location (e.g., holds the address) of an item of data. When the data structure is moved from place to place in memory or between machines, the addresses of the data structure change. Therefore, pointers in data structures cannot be saved and restored to arbitrary memory locations or transferred between processes or servers without adjustment or special conversion. In general, the adjustment/conversion is a two step process: first, convert the pointers in the data structure to base-relative (i.e., relative to the address of the first location of the data structure) or to another data type; then, store or send the new (modified) data structure. The operation is reversed when loading or receiving a data structure.

The standard adjustment/conversion process uses a base address and an offset. The process converts all the pointers in the data structure to an address relative to this base address. This technique requires searching the data structure, and fixing the pointers. This means that each type of data structure requires a specification for conversion. An alternative technique is to change the pointers in the data structure to base-relative offsets. This solves the loading and saving problem, but requires maintaining and managing the base pointers specific to each and every data structure. When the relative pointer is passed to a function, the base pointer must also be passed, so the basic program structure is more complicated.

The problems with these methods are performance and complexity. Searching a data structure to convert it for sharing or storage is expensive. Maintaining a base pointer and always adding it to each offset pointer is tedious, requires more code, and requires wrapper modules or globals to handle the base pointer.

When multiple shared memory blocks or shared network objects contain linked pointers, the inter-process conversion routines must translate all of the addresses from one process space to another. This puts a practical limitation on the complexity of objects that can be easily shared between processes or servers. For example, a large linked list (like a hash table) being sent from one server to another must be converted twice, thereby requiring twice the intermediate storage space and possibly long conversion times.

Yet another problem with current pointer arrangements is encountered when moving from a 32-bit operating system to a 64-bit operating system, such as Microsoft's NT 64. The conventional pointers do not work in the new operating system, because pointers and offsets become 64-bit entities. So all 32-bit offsets must be manually found and typecast correctly to unsigned 64-bit numbers.

SUMMARY OF THE INVENTION

This invention is directed to solving these and other problems and disadvantages of the prior art. Generally according to the invention, an auto (i.e., self)-relative pointer defines a pointed-to location by means of an offset from its own location. In other words, the address of the pointer is offset by the value of the pointer to obtaining the address of the pointed-to location.

According to one aspect of the invention, a method of defining a pointer to a location comprises the steps of determining an offset of a location of the pointer from a location that the pointer is to point to, and storing the offset as a value of the pointer in the location of the pointer. According to another aspect of the invention, a method of determining a location pointed to by a pointer comprises the steps of retrieving from a location of the pointer a value of the pointer, and using the retrieved value as an offset from the location of the pointer to identify the location pointed to by the pointer. While the methods comprise the steps of the just-characterized procedures, another aspect of the invention embraces apparatuses that effect the method steps. Each apparatus preferably includes an effector—any entity that effects the corresponding step, unlike a means—for each step.

Simplicity is the biggest advantage of the invention over the prior art. There is no pointer conversion. Data structures built with autorelative pointers can be used in inter-process and/or inter-server communications without conversion. Auto-relative pointers can be placed in shared memory, stored on disk, and moved from one part of memory to another, without translation or tracking of the base address. The invention makes it easy to build a relative pointer class (e.g., in C++) with all the features of normal pointers, while providing fast and easy de-referencing without a base pointer. Because of the simplicity, errors are easier to avoid and to find. This technique is faster, compilers can optimize it easier, and it produces more efficient code than base-relative pointer techniques. Very complex objects can be passed between processes and over networks without special conversion and extra intermediate memory storage. Structures do not require a mapping specification for automatic (inter-process) conversion.

Furthermore, the invention solves the pointer problem encountered in going from a 32-bit operating system to a 64-bit operating system. Unlike in the prior art, the offsets do not need to be manually converted to 64-bit numbers, because all of the auto-relative pointers can be assigned to the same class or group, and then typecasting of the pointers is done once for the whole class or group.

These and other advantages and features of the present invention will become more apparent from the following description of an illustrative embodiment of the invention considered together with the drawing.

BRIEF DESCRIPTION OF THE DRAWING

FIG. 2 is a functional flow diagram of generating an autorelative pointer of the computer of FIG. 1; and FIG. 3 is a functional flow diagram of using an auto-relative pointer of the computer of FIG. 1.

DETAILED DESCRIPTION

Figure 1:
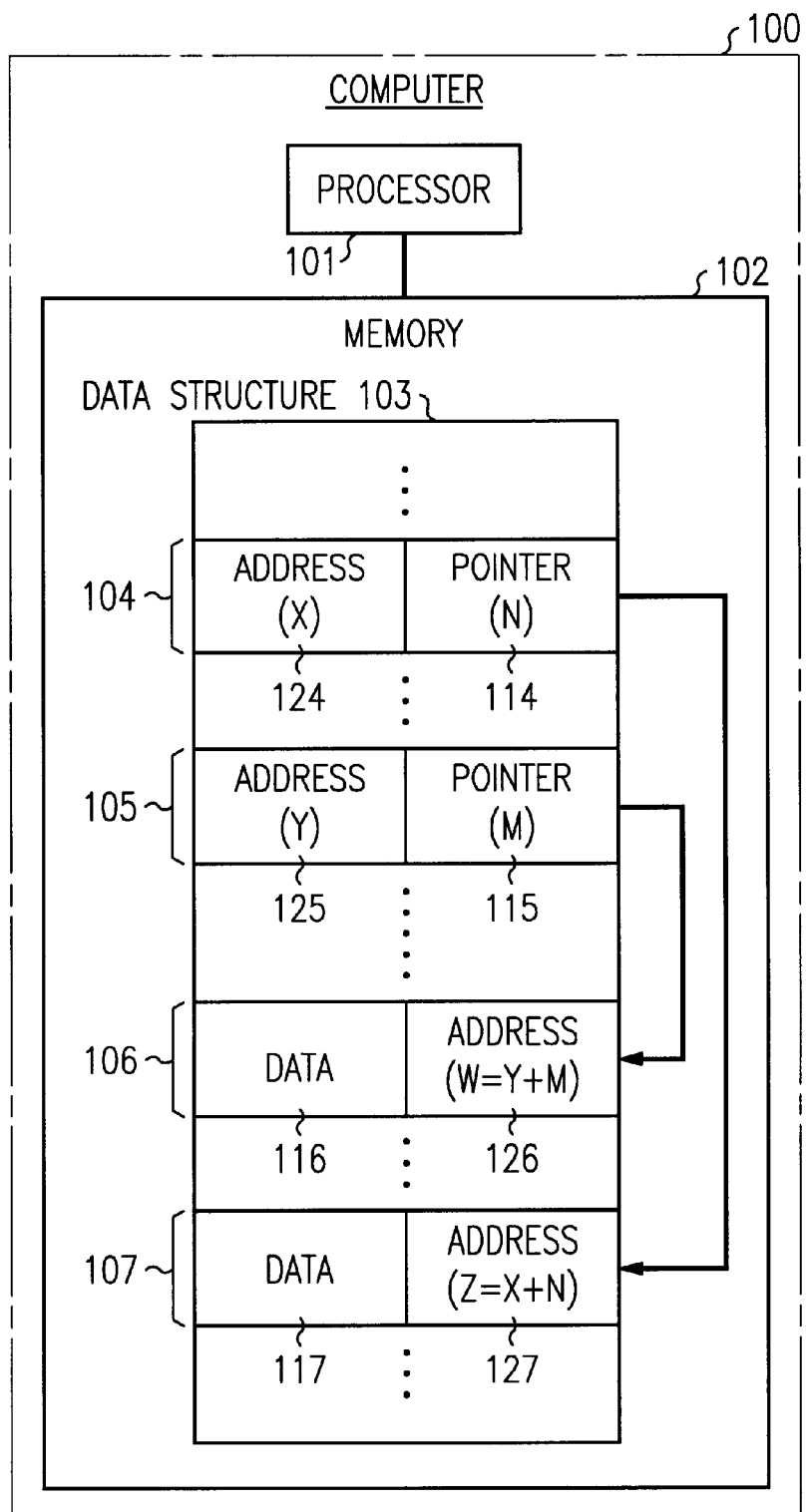
FIG. 1 is a block diagram of a computer that includes an illustrative embodiment of the invention.

FIG. 1 shows a typical computer 100 such as a personal computer (PC) or a workstation. It comprises a processor 101 that executes programs which are stored in a memory 102. Memory 102 may include both a computer internal memory, such as RAM and hard disk, as well as a portable memory, such as a floppy disk, a PCMCIA memory module, or a CD-ROM. Stored in memory 102 is a data structure 103 which comprises a plurality of memory locations 104–107. The memory locations include data locations 106,107 for storing data 116,117, and pointer locations 104,105 for storing pointers 114,115 to data locations 106,107, respectively. Each location 104–107 has an address 124–127, respectively, in memory 102. The values of X, Y, W, and Z of addresses 124–127 are a function of where in physical memory 102, where in the virtual address space of memory 102, or in which memory, data structure 102 is stored. It therefore follows that if data structure 103 is moved around in memory 102 or from one memory to another, the values of addresses 124–127 will change.

According to the invention, pointers 114,115 are autorelative. That is, each stores the offset of the pointed-to location relative to the address of the pointer itself. Thus, pointer 114 stores the offset value N which points in data structure 103 to data 117, and pointer 115 stores the offset value M which points in data structure 103 to data 116. The offset values M and N are not relative to a base address, but are fixed; they do not change as data structure 103 moves around in memory 102 or moves from memory to memory. The address 126 or 127 of data 116 or 117 pointed to by a pointer 114 or 115 is the address of the pointer 114 or 115 itself plus the pointer's offset value. Thus, the value W of the address 126 of data 116 pointed to by pointer 115 is the value Y of the address 125 of pointer 115 plus the offset value M of pointer 115. And the value Z of the address 127 of data 117 pointed to by pointer 114 is the value X of the address 124 of pointer 114 plus the offset value N of pointer 114. This relationship does not change as the values of X, Y, W, and Z change as data structure 103 moves around. And, at any time that a pointer 114 or 115 is accessed in memory 102, the present value of its address 124 or 125 is known (for example, from the computer's address register; else the pointer could not have been accessed). De-referencing of pointers 114, 115 does not rely on a base address; in fact, a base pointer is not needed at all, and it does not matter what the actual values of the addresses are.

FIG. 2 shows how an auto-relative pointer 114 or 115 is generated. When the need to generate a pointer to a location 106 or 107 arises, at step 200, the offset M or N between the pointer location 104 or 105 and the location 106 or 107 is determined, at step 202, and stored as the value of the pointer in the pointer location 104 or 105, at step 204. Pointer generation then ends, at step 206.

FIG. 3 shows how an auto-relative pointer 114 or 115 is used. When the need to use a pointer 114 or 115 arises, at step 300, the address 124 or 125 of the pointer's location 104 or 105 is determined, at step 302. For example, the determination is made by reading the present value of a data address register 109 of computer 100. Then the pointer's address 124 or 125 is used to retrieve the value M or N of pointer 114 or 115, at step 304, and the retrieved value is used to adjust (e.g., increment or decrement) the pointer's address to obtain the address 126 or 127 of the pointed-to location 106 or 107. The obtained address 126 or 127 is then used to access the pointed-to data 116 or 117, at step 308, and use of the pointer ends, at step 310.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method of defining a pointer to a location, comprising the steps of:

determining an offset of a location of the pointer from a location that the pointer is to point to; and storing the offset as a value of the pointer in the location of the pointer.

2. The method of claim 1 wherein:

the step of determining comprises the step of
determining an offset of an address of the pointer from an address of a location that the pointer is to point to; and the step of storing comprises the step of
storing the offset as a value of the pointer at the address of the pointer.

3. The method of claim 2 further comprising the steps of:

retrieving the stored value from the location at the address of the pointer; and using the retrieved value as an offset from the address of the pointer to generate an address of the location pointed to by the pointer.

4. The method of claim 1 further comprising the steps of:

retrieving the stored value from the location of the pointer; and using the retrieved value as an offset from the location of the pointer to identify the location pointed to by the pointer.

5. The method of claim 1 wherein:

the step of retrieving comprises the steps of
determining an address of a location of the pointer, and
retrieving a value of the pointer from the location; and the step of using comprises the steps of
using the retrieved value as an offset from the determined address to generate a second address, and
using the second address to address the location pointed to by the pointer.

6. A method of determining a location pointed to by a pointer, comprising the steps of:

retrieving from a location of the pointer a value of the pointer; and using the retrieved value as an offset from the location of the pointer to identify the location pointed to by the pointer.

7. The method of claim 6 wherein:

the step of determining comprises the step of
retrieving the value of the pointer from the location of the pointer having an address; and the step of using comprises the step of
using the retrieved value as an offset from the address to generate an address of the location pointed to by the pointer.

8. The method of claim 6 wherein:

the step of retrieving comprises the steps of
  determining a location of the pointer, and
  retrieving from the determined location a value of the pointer; and the step of using comprises the steps of
  using the retrieved value as an offset from the location of the pointer to identify a second location, and
  using the second location as the location pointed to by the pointer.

9. An apparatus that performs the method of claims 1 or 2 or 4 or 3 or 6 or 7 or 8 or 5.

10. An apparatus for defining a pointer to a location, comprising:

an effector of determining an offset of a location of the pointer from a location that the pointer is to point to; and an effector of storing the offset as a value of the pointer in the location of the pointer.

11. An apparatus for determining a location pointed to by a pointer, comprising:

an effector of retrieving from a location of the pointer a value of the pointer; and an effector of using the retrieved value as an offset from the location of the pointer to identify the location pointed to by the pointer.

* * * * *